US012574457B1

(12) United States Patent
Anaruk et al.

(10) Patent No.: US 12,574,457 B1
(45) Date of Patent: *Mar. 10, 2026

(54) DATA ACCESS SYSTEM FOR REPRESENTATIVES

(71) Applicant: United Services Automobile Association (USAA), San Antonio, TX (US)

(72) Inventors: Andrew L. Anaruk, San Antonio, TX (US); Patrick Adam, Helotes, TX (US); Benjamin Goos, San Antonio, TX (US); Gabriel Carlos Fernandez, San Antonio, TX (US); Ana Maldonado, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/361,759

(22) Filed: Jul. 28, 2023

Related U.S. Application Data

(63) Continuation of application No. 17/523,625, filed on Nov. 10, 2021, now Pat. No. 11,758,039, which is a (Continued)

(51) Int. Cl.
| | |
|---|---|
| *H04M 3/22* | (2006.01) |
| *G10L 15/26* | (2006.01) |

(Continued)

(52) U.S. Cl.
CPC ........... *H04M 3/2281* (2013.01); *G10L 15/26* (2013.01); *H04M 3/382* (2013.01); *H04M 3/436* (2013.01)

(58) Field of Classification Search
CPC .... H04M 3/2281; H04M 3/382; H04M 3/436; G10L 15/26
See application file for complete search history.

(56) References Cited

U.S. PATENT DOCUMENTS 6,233,567 B1 * 5/2001 Cohen ..................... G06F 21/10
                                                      705/59
8,688,072 B1 * 4/2014 Agarwal ............... H04W 12/06
                                                      455/410

(Continued)

OTHER PUBLICATIONS

U.S. Appl. No. 17/523,625, filed Nov. 10, 2021, Data Access System for Representatives.

(Continued)

*Primary Examiner* — Phung-Hoang J Nguyen
(74) *Attorney, Agent, or Firm* — Perkins Coie LLP

(57) ABSTRACT

Embodiments described herein disclose methods and systems for providing selective data access to representatives. In some embodiments, the system can monitor a call between a user and a representative regarding a subject matter. The user can have an associated profile with data, and the data can be locked such that the representative cannot access the data. During the conversation between the representative and the user, the system can continuously convert both parties' speech into text. The system can determine an intent of the call based on the text and unlock a portion of the data about the user based on the determined intent of the call. Only the unlocked portion of the data is displayed to the representative.

20 Claims, 4 Drawing Sheets

Related U.S. Application Data continuation of application No. 17/143,737, filed on Jan. 7, 2021, now Pat. No. 11,206,329, which is a continuation of application No. 16/706,557, filed on Dec. 6, 2019, now Pat. No. 10,917,516.

(60) Provisional application No. 62/781,471, filed on Dec. 18, 2018.

(51) Int. Cl.
   *H04M 3/38*        (2006.01)
   *H04M 3/436*       (2006.01)

(56)                References Cited

U.S. PATENT DOCUMENTS

| | | | | |
|---|---|---|---|---|
| 10,917,516 | B1 | 2/2021 | Anaruk et al. | |
| 11,206,329 | B1 | 12/2021 | Anaruk et al. | |
| 2005/0086173 | A1* | 4/2005 | Kalwit | G06F 21/10 |
| | | | | 705/59 |
| 2012/0021721 | A1 | 1/2012 | Reed et al. | |
| 2012/0096521 | A1 | 4/2012 | Peddada | |
| 2013/0275862 | A1* | 10/2013 | Adra | H04L 51/046 |
| | | | | 715/234 |
| 2014/0368719 | A1 | 12/2014 | Kaneko et al. | |
| 2015/0116353 | A1 | 4/2015 | Miura et al. | |
| 2015/0200922 | A1* | 7/2015 | Eschbach | H04L 63/08 |
| | | | | 358/1.14 |
| 2016/0044039 | A1* | 2/2016 | Montanari | G06F 21/6218 |
| | | | | 726/27 |
| 2017/0019784 | A1 | 1/2017 | Janefalkar | |
| 2017/0026514 | A1 | 1/2017 | Dwyer et al. | |
| 2017/0034177 | A1* | 2/2017 | Narasimhan | G06Q 50/265 |
| 2017/0094019 | A1 | 3/2017 | Ahmed et al. | |
| 2018/0270628 | A1* | 9/2018 | Khaleghi | G16H 50/20 |
| 2018/0349995 | A1 | 12/2018 | Kunjachan et al. | |
| 2019/0205861 | A1 | 7/2019 | Bace | |
| 2019/0342335 | A1 | 11/2019 | Ni et al. | |
| 2020/0005349 | A1* | 1/2020 | Brody | G06Q 30/0245 |

OTHER PUBLICATIONS

U.S. Appl. No. 17/143,737, U.S. Pat. No. 11,206,329, filed Jan. 7, 2021, Dec. 21, 2021, Data Access System for Representatives.

U.S. Appl. No. 16/706,557, U.S. Pat. No. 10,917,516, filed Dec. 6, 2019, Feb. 9, 2021, Data Access System for Representatives.

U.S. Appl. No. 62/781,471, filed Dec. 18, 2018, Data Access System for Representatives.

* cited by examiner

DATA ACCESS SYSTEM FOR REPRESENTATIVES

CROSS-REFERENCE TO RELATED APPLICATIONS

This application is a continuation of U.S. patent application Ser. No. 17/523,625 filed Nov. 10, 2021, now allowed, which is continuation of U.S. patent application Ser. No. 17/143,737 filed Jan. 7, 2021, issued as U.S. Pat. No. 11,206,329 on Dec. 21, 2021, which is a continuation of U.S. patent application Ser. No. 16/706,557 filed Dec. 6, 2019, issued as U.S. Pat. No. 10,917,516 on Feb. 9, 2021, which is a non-provisional of and claims priority to U.S. Provisional Application No. 62/781,471 filed Dec. 18, 2018, entitled "DATA ACCESS SYSTEM FOR REPRESENTA-TIVES," all of which are hereby incorporated by reference in their entireties for all purposes.

BACKGROUND

Companies constantly try to find the proper amount of data access for employees. That is, employees need to have enough access to perform their job duties but generally do not need access to all information. Data access for employees such as customer service representatives is becoming increasingly important as privacy becomes a further concern for companies.

Figure 1:
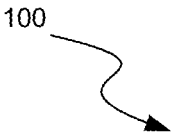
FIG. 1 is a block diagram illustrating an overview of devices on which some implementations can operate.
Figure 1:
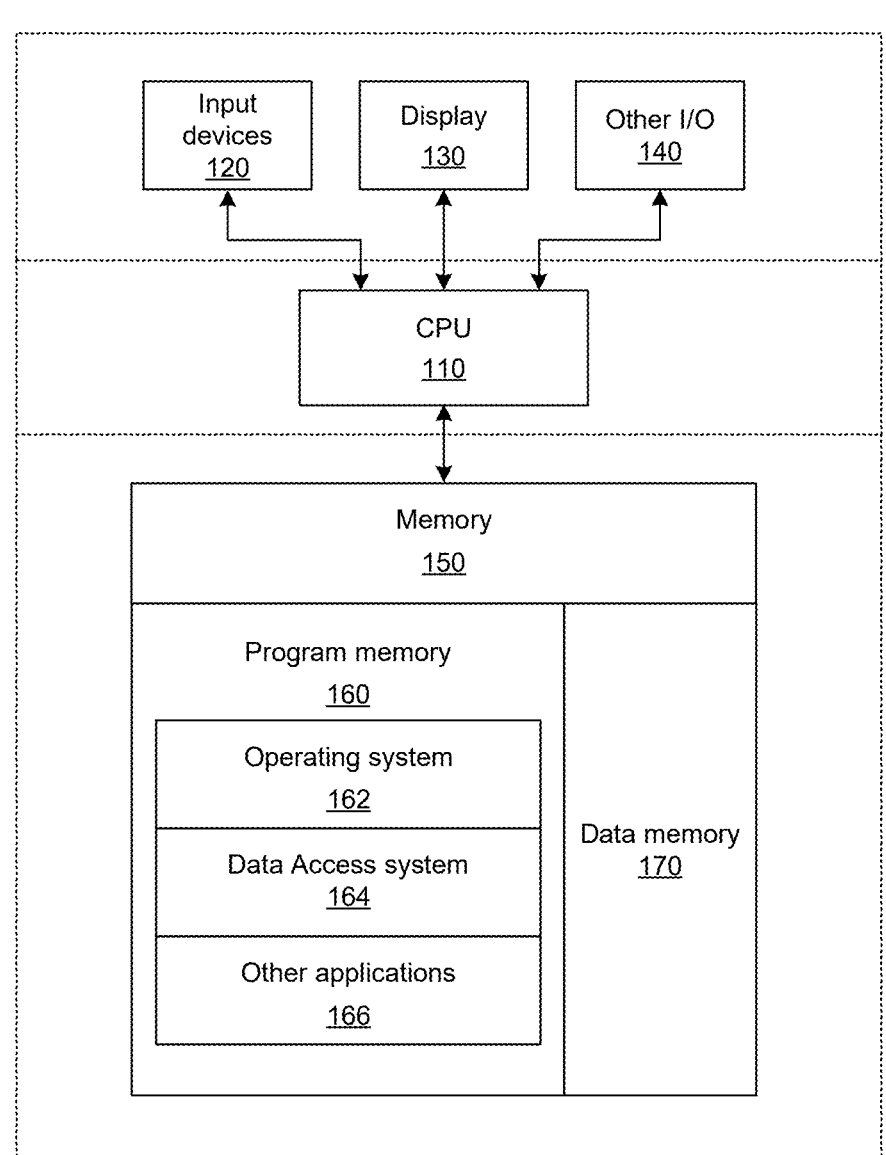

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

As privacy becomes a focus for many companies, companies that store customer information are being forced to control data access to customer information. That is, some employees have access to customer data while others will have little or no access to customer data. There are easy cases in which access does not need to be granted to employees. For example, property inspectors do not need access to the homeowner's personal information such as social security number, mortgage, employment status and birthday. However, a customer or member service representative ("representative") may, during the course of a call with a customer, need access to various information to better serve the customer.

Current systems lack to the technology to adequately protect customer information and allow representatives to perform their job duties. Current systems provide access to all customer information to representatives, regardless of the type of information being requested or discussed. While convenient, providing such uncontrolled access can cause issues. For example, in some circumstances, representatives may use the information carelessly or nefariously. Should the representative notice something interesting in the customer's profile, the representative may review the user's social media pages or finances out of curiosity. In other circumstances, the representative could collect a customer's information and sell it or otherwise partake in illegal activities. Even if the representative does nothing with the customer data, providing access to the customer data can put the company and/or employee at risk of claims. Another issue of providing unlimited customer data to representatives is that fraudsters may trick the representative into giving out customer data. For example, a fraudster may ask the representative about some of the customer's past or personal information to use in other scenarios (e.g., "What color was my last Honda?" or "What birth date do you have for me in the system?"). In many cases, much of the user's personal information is not relevant to the call (e.g., the user's birth date, social security number).

Systems and methods disclosed herein address the challenge of adequately protecting customer information and yet allowing a representative to perform his or her duties. In some embodiments, an organization receives a call from a user. The call can be received by an interactive voice response (IVR) system and the user can provide identification and, in some cases, authentication information. The IVR system can determine the subject matter the user is calling about (e.g., home insurance, property claim). When the call is routed to a representative, the system can monitor the call between the user and the representative. The user can have an associated profile with data about the user (e.g., birthday, family members, salary, employment status, products or services with the organization). Such data can be locked such that the representative cannot access the data. As the user and the representative converse, the system can continuously convert the speech from the call into text. The system can determine an intent of the call and what information the representative needs to know based on an analysis of the text. A portion of the data form the user's profile can be unlocked based on the determined intent of the call. Such unlocked data can be displayed on a display screen of the representative or the representative can access the unlocked data in another way. As the user and the representative continue conversing, additional data can be unlocked as needed.

The user may request additional information about a product or about himself or herself that is outside of the initial subject matter of the call. Assuming the data is unlocked, the representative can provide such information to the user. As the conversation continues and the speech is determined and analyzed for intent, the system can indicate to the representative the information by flashing the information on the screen or highlighting a certain portion of the screen or bringing up an automated chat box with the answer.

If, on the other hand, the user asks for information that is still part of the locked data, the representative can ask the user to provide authentication data (e.g., birthday) to further verify the user's identity before handing out additional or more sensitive information. The authentication data can be input into a one-way function such as a hash function. The system can compare the output of the authentication data after being hashed with the output of previously provided and hashed data using the same hash function. If the outputs (hashes) are the same, then the user has provided correct information and the user's trust level has been elevated such that additional data can be unlocked and displayed on the representatives display screen or otherwise provided to the representative. Thus, the sensitive data can stay protected if the user cannot provide the proper credentials. In response to the user not providing the proper authentication information, the call can be transferred to a fraud unit or other service equipped to handle calls needing additional authentication.

In some embodiments, the one-way function can be used to verify information. That is, if the user asks the representative to provide information that the user should know (e.g., social security number), the representative can confirm that a user-provided social security number matches what is recorded in the system using the one-way function but cannot actually see the social security number that is recorded in the system. Thus, the representative cannot give out the social security number unknowingly.

To determine the intent of the call based on the conversation, artificial intelligence can be used. A model can be trained and updated. When fraudulent calls occur, such data can be used as examples of potentially fraudulent behavior when analyzing call data.

The system can generate a list of products or services potentially of interest to the user based on the profile of the user and the text. Additional portions of the data can be unlocked based on this list and displayed to the representative, allowing the representative to act on potential marketing leads if appropriate.

This disclosure describes systems and processes designed to increase data security for information used by representatives when servicing customers by limiting data access using unique targeted techniques. Various embodiments may provide one or more of the following technological improvements: (1) increase security by selectively limiting representative data access to subject matter being discussed during a call or otherwise indicated; (2) increase efficiency of representatives by providing targeted information to the representative quicker; and (3) reduce the likelihood that a representative will unknowingly give away data by requiring additional authentication or confirmation using a one-way function.

In the following description, for the purposes of explanation, numerous specific details are set forth in order to provide a thorough understanding of embodiments of the present technology. It will be apparent, however, that embodiments of the present technology may be practiced without some of these specific details Suitable System Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that manage payment card transaction authorizations. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display 130 is separate from the input device. Examples of display devices are: a LCD display screen; a LED display screen; a projected, holographic, or augmented reality display (such as a heads-up display device or a head-mounted device); and so on. Other I/O devices 140 can also be coupled to the processor, such as a network card, video card, audio card, USB, FireWire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory 150 includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 150 is not a propagating signal divorced from underlying hardware; a memory is thus non-transitory. A memory 150 can include program memory 160 that stores programs and software, such as an operating system 162, data access system 164, and other application programs 166. A memory 150 can also include data memory 170 that can include data profiles (e.g., products or services the user has with the company, financial information, family status, employment information, age, social security number, health information), and user preferences for the representatives, which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
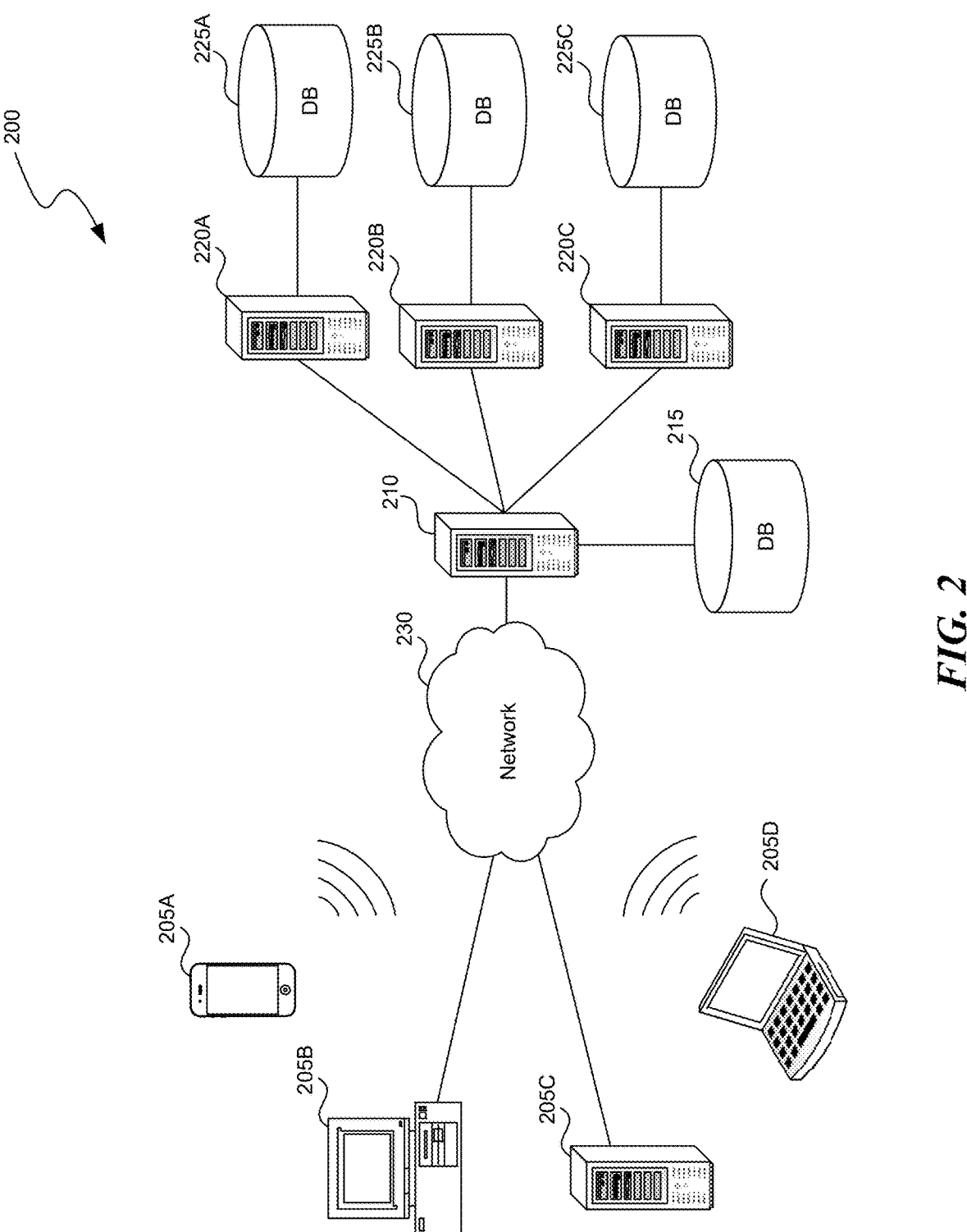
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device 210.

In some implementations, server computing device 210 can be an edge server that receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server computing device 220 corresponds to a group of servers.

Client computing devices 205 and server computing devices 210 and 220A-C can each act as a server or client to other server/client devices. Server 210 can connect to a database 215. Servers 220A-C can each connect to a corresponding database 225A-C. As discussed above, each server 220A-C can correspond to a group of servers, and each of these servers can share a database or can have their own database. Databases 215 and 225 can warehouse (e.g., store) information such as application programs 166. A memory 150 can also include data memory 170 that can include data profiles (e.g., products or services the user has with the company, financial information, family status, employment information, age, social security number, health information), and user preferences for the representative. Though databases 215 and 225A-C are displayed logically as single units, databases 215 and 225A-C can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205A-D can be connected to network 230 through a network interface, such as by wired or wireless communication. While the connections between server 210 and servers 220A-C are shown as separate connections, these connections can be any kind of local, wide area, wired, or wireless network, including network 230 or a separate public or private network.

Figure 3:
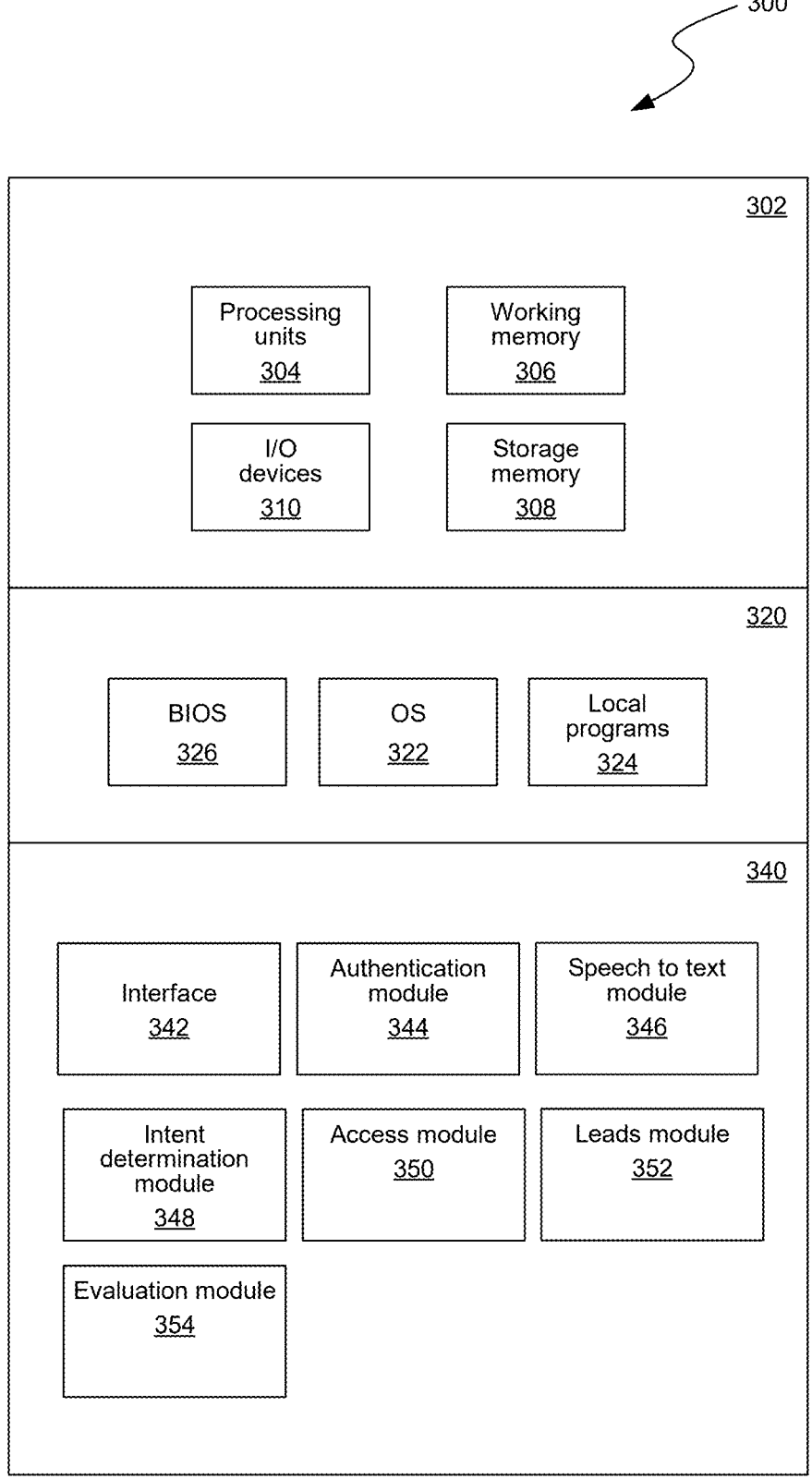
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310. Components 300 can be implemented in a client computing device such as client computing devices 205 or on a server computing device, such as server computing device 210 or 220A-C. In some embodiments, some components of components 300 can be implemented in a client computing device while others are implemented on a server computing device.

General software 320 can include various applications, including an operating system 322, local programs 324, and a basic input output system (BIOS) 326. Specialized components 340 can be subcomponents of a general software application 320, such as local programs 324. Specialized components 340 can include authentication module 344, speech to text module 346, intent determination module 348, access module 350, leads module 352, evaluation module 354, and components that can be used for transferring data and controlling the specialized components, such as interface 342. In some implementations, components 300 can be in a computing system that is distributed across multiple computing devices or can be an interface to a server-based application executing one or more of specialized components 340.

Authentication module 344 authenticates a caller when the user first calls an organization. Authentication module 344 can identify the user by the user's device or other characteristics (e.g., voice biometrics) and request information from the user (e.g., personal identification number). The user can have a profile with information relating to the user (e.g., personal identification number registered devices, employment status, products and services held with the company, financial information, social security number, birthday). The data in the user's profile can be locked such that representatives do not have unlimited access to such data. The information in the user's profile can be used to authenticate the user. In some embodiments, the functionality of authentication module 344 can be done in part or full by an IVR system. Authentication module 344 can further determine a preliminary subject matter for which the user is calling such that the call can be directed to a representative.

While the IVR system is assisting the user and after the call has been transferred to a representative, speech to text module 346 can monitor the call and conversation and continuously convert the speech of each party to text.

Intent determination module 348 analyzes the text of the call (and, sometimes, an initial subject matter determined by the IVR system) to determine an intent of the call. Intent determination module 348 can use artificial intelligence to aid in the determination process. For example, if the user is calling about an automobile insurance claim, the user may have specified "auto insurance" at the IVR system stage but intent determination module 348 can determine that the user really meant to call about a particular automobile insurance claim based on the conversation.

Once a subject matter has been determined, access module 350 unlocks the portion of data in the user's profile relevant to the subject matter of the call. In some embodiments, such information (and only such information) can surface to the representative's screen so that the representative can help the user. In some embodiments, data relating to the user can appear on the screen with the locked portion being obscured. By obscuring the locked portions and keeping the locked portions in places the information would typically be found, the representative can see what types of information is available for the user.

When the user asks for confirmation of specific information locked by the access module 350, access module 350 can unlock data using a second method. Access module 350 can include a one-way function (e.g., hash function) that outputs a fixed length result. The same input to the one-way function will always give the same output. However, if any of the input data has changed, the output will be different. For example, the user can ask the representative what birthday is listed in the system for the user. Instead of access module 350 providing such information to the representative, access module 350 can instead confirm the birthday information using the one-way function. Thus, the representative can confirm that the correct birthday is input but cannot provide the birthday. If the user does not know their birthday, the user is probably a fraudster and the representative will be prevented from telling the fraudster the information. To confirm the birthday, the representative can ask the user to state the user's birthday. The birthday can be input into access module 350 and access module 350 can create an output. The output of the received birthday can be compared with an output of the previously recorded birthday input into the one-way function. If the outputs are the same, then the representative can confirm that the system has the correct birthday recorded. On the other hand, if the user was simply asking to obtain information about the alleged caller nefariously, the representative did not have access to the user's real birthday to accidentally give to the fraudster.

During the course of the conversation, the user can ask the representative a question that requires the representative to review the user's information that is outside of or more sensitive than the initial subject matter of the call. In some cases, the requested data is not locked, and the representative can access the data. Based on the conversation, access module 350 can determine what information is necessary and display the unlocked information for the representative. When, however, the data is locked, the representative may be required to obtain additional information from the user to verify the user's identity (e.g., to a higher level). Because the representative does not have access to all information to verify the user's identity, the representative can use the one-way function to further authenticate the user and thus unlock additional data. For example, the user can ask the user for a social security number and input the number into the one-way function. If the one-way function compares the output with the output of the system's previously recorded social security number from the one-way function, then additional data can be unlocked. If the outputs do not match, the representative can transfer the user to another representative (e.g., fraud unit, representative with additional accesses).

Leads module 352 analyzes the current products and services purchased by the user and based on the current products and services and the analysis of the conversation, determines other products or services that may be of interest to the user. Leads module 352 can display a list of the products and services that may be of interest to the user on the representative's screen. Additionally, access module 350 can unlock the user's personal data relating to the products and services. For example, leads module 352 determines that the user got married (e.g., the recently changed his or her name and added the spouse onto accounts), leads module 352 can determine that the user may be interested in life insurance. Thus, access module 350 can display on the representative's screen that the user is married and suggest that the representative mention that the user may want to consider life insurance due the user's recent marriage.

Evaluation module 354 can evaluate the conversation either in real-time or asynchronously to determine fraud, train a model, and/or assist a representative.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
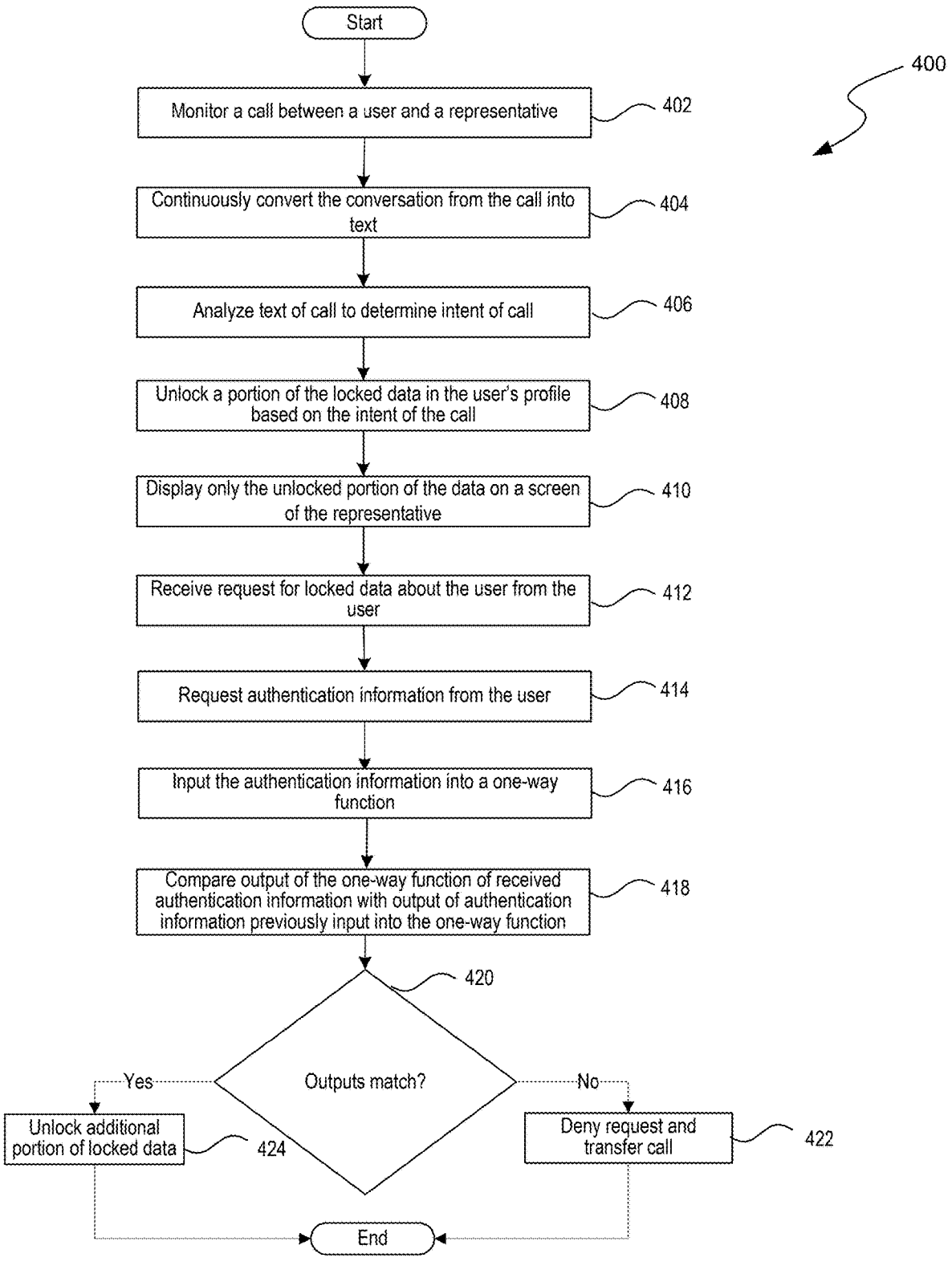
FIG. 4 is a flow diagram illustrating a process used in some implementations for providing selective data access.

FIG. 4 is a flow diagram illustrating a set of operations 400 for providing selective data access. Monitoring operation 402 monitors a call between a user and a representative. During the initial portion of the conversation, most if not all, of the user's information is locked such that the data is not accessible to the representative. Converting operation 404 continuously converts the conversation from the call into text. Thus, the text includes multi-party speech inputs. Analyzing operation 406 analyzes the text of the call to determine an intent. For example, is the user calling about banking status or investment advice? Unlocking operation 408 unlocks a portion of the locked data in the user's profile based on the intent of the call. For example, if the user is calling about an auto insurance claim, the system may unlock the user's automobile insurance policy and information regarding the claim thus far. Displaying operation 410 can display only the unlocked portion of the data on the representative's screen.

Receiving operation 412 receives a request for the representative to provide or use information about the user that is locked either because it is more sensitive, off-topic, or otherwise unavailable to the representative. To unlock the data, in requesting operation 414, the representative can request authentication information from the user. Inputting operation 416 can input the authentication information into a one-way function which returns an output. Comparing operation 418 can compare the output of the one-way function of the received authentication information with an output of the one-way function of the equivalent data in the user's profile. Decision operation 420 determines whether the outputs match. When the outputs do not match, decision operation 420 can branch to denying operation 422 where the user's request for addition information is denied by the representative and the representative can transfer the call to a different representative with additional accesses or the fraud unit. When the outputs match, the user is authenticated to a higher level and decision operation 420 can branch to unlocking operation 424 where the system unlocks an additional portion of the locked data for the representative to assist the user.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communication links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:

receiving, at a device associated with a user, a communication from at least one person regarding a change in a customer profile, wherein the customer profile is linked with a group of products or services provided to the at least one person;

displaying, via an interface of the device, a first unlocked portion and a locked portion of personal data associated with the at least one person, wherein the first unlocked portion is unobscured from the user based on a subject matter of the communication being associated with the first unlocked portion of the personal data, wherein the locked portion is obscured such that the user cannot initially access the personal data;

determining the change in the customer profile affects at least one product or service in the group of products or services, and the change requires additional information from the at least one person;

in response to determining the change affects the at least one product or service displaying, via the interface of the device, the at least one product or service to present to the at least one person based on the change in the customer profile;

generating, from the locked portion, a second unlocked portion of the personal data based on the at least one product or service, wherein the second unlocked portion is different than the first unlocked portion; and displaying, via the interface of the device, an unobscured version of the second unlocked portion of the personal data, and at least one chat interface configured for inputting user input and for displaying information associated with the at least one product or service.

2. The method of claim 1, further comprising:

receiving, from the at least one person, a request for information relating to the at least one person; and in response to the information being part of the locked portion of the personal data, requesting authentication information from the at least one person.

3. The method of claim 2, further comprising:

inputting the authentication information into a one-way function, wherein an output of the one-way function is compared with an output of the authentication information previously input into the one-way function; and transferring the communication to a different representative based on the output of the one-way function not matching the output of the authentication information.

4. The method of claim 1, further comprising:

displaying a visual indication, in the second unlocked portion of the personal data in a user profile of the at least one person, to identify at least one item in the user profile related to the at least one product or service to market to the at least one person.

5. The method of claim 1, further comprising:

displaying, via the interface of the device, a product or service to market to the at least one person based on an intent of the communication.

6. The method of claim 1, wherein an additional portion of the personal data is unlocked based on a list of products or services to market to the user.

7. The method of claim 1, further comprising verifying authentication information of the at least one person based on a comparison of an output of a hash function with an output of the authentication information previously input into the hash function.

8. A system comprising:

one or more processors; and one or more memories storing instructions that, when executed by the one or more processors, cause the system to perform a process comprising:

receiving, at a device associated with a user, a communication from at least one person regarding a change in a customer profile, wherein the customer profile is linked with a group of products or services provided to the at least one person;

displaying, via an interface of the device, a first unlocked portion and a locked portion of personal data associated with the at least one person, wherein the first unlocked portion is unobscured from the user based on a subject matter of the communication being associated with the first unlocked portion of the personal data, wherein the locked portion is obscured such that the user cannot initially access the personal data;

determining the change in the customer profile affects at least one product or service in the group of products or services, and the change requires additional information from the at least one person;

in response to determining the change affects the at least one product or service, displaying, via the interface of the device, the at least one product or service to present to the at least one person based on the change in the customer profile;

in response to the determining the at least one product or service, generating, from the locked portion, a second unlocked portion of the personal data based on the at least one product or service, wherein the second unlocked portion is different than the first unlocked portion; and displaying, via the interface of the device, an unobscured version of the second unlocked portion of the personal data, and at least one chat interface configured for inputting user input and for displaying information associated with the at least one product or service.

9. The system according to claim 8, wherein the process further comprises:

receiving, from the at least one person, a request for information relating to the at least one person; and in response to the information being part of the locked portion of the personal data, requesting authentication information from the at least one person.

10. The system according to claim 9, wherein the process further comprises:

inputting the authentication information into a one-way function, wherein an output of the one-way function is compared with an output of the authentication information previously input into the one-way function; and transferring the communication to a different representative based on the output of the one-way function not matching the output of the authentication information.

11. The system according to claim 8, wherein the process further comprises:

displaying a visual indication, in the second unlocked portion of the personal data in a user profile of the at least one person, to identify at least one item in the user profile related to the at least one product or service to market to the at least one person.

12. The system according to claim 8, wherein the process further comprises:

displaying, via the interface of the device, a product or service to market to the at least one person based on an intent of the communication.

13. The system according to claim 8, wherein an additional portion of the personal data is unlocked based on a list of products or services to market to the user.

14. The system according to claim 8, wherein the process further comprises verifying authentication information of the at least one person based on a comparison of an output of a hash function with an output of the authentication information previously input into the hash function.

15. A non-transitory computer-readable medium storing instructions that, when executed by a computing system, cause the computing system to perform operations comprising:

receiving, at a device associated with a user, a communication from at least one person regarding a change in a customer profile, wherein the customer profile is linked with a group of products or services provided to the at least one person;

displaying, via an interface of the device, a first unlocked portion and a locked portion of personal data associated with the at least one person, wherein the first unlocked portion is unobscured from the user based on a subject matter of the communication being associated with the first unlocked portion of the personal data, wherein the locked portion is obscured such that the user cannot initially access the personal data;

determining the change in the customer profile affects at least one product or service in the group of products or services, and the change requires additional information from the at least one person:

in response to determining the change affects the at least one product or service, displaying, via the interface of the device, the at least one product or service to present to the at least one person based on the change in the customer profile;

generating, from the locked portion, a second unlocked portion of the personal data based on the at least one product or service, wherein the second unlocked portion is different than the first unlocked portion; and displaying, via the interface of the device, an unobscured version of the second unlocked portion of the personal data, and at least one chat interface configured for inputting user input and for displaying information associated with the at least one product or service.

16. The non-transitory computer-readable medium of claim 15, wherein the operations further comprise:

receiving, from the at least one person, a request for information relating to the at least one person; and in response to the information being part of the locked portion of the personal data, requesting authentication information from the at least one person.

17. The non-transitory computer-readable medium of claim 16, wherein the operations further comprise:

inputting the authentication information into a one-way function, wherein an output of the one-way function is compared with an output of the authentication information previously input into the one-way function; and transferring the communication to a different representative based on the output of the one-way function not matching the output of the authentication information.

18. The non-transitory computer-readable medium of claim 15, wherein the operations further comprise:

displaying a visual indication, in the second unlocked portion of the personal data in a user profile of the at least one person, to identify at least one item in the user profile related to the at least one product or service to market to the at least one person.

19. The non-transitory computer-readable medium of claim 15, wherein the operations further comprise:

displaying, via the interface of the device, a product or service to market to the at least one person based on an intent of the communication.

20. The non-transitory computer-readable medium of claim 15, wherein an additional portion of the personal data is unlocked based on a list of products or services to market to the user.

\* \* \* \* \*